(12) United States Patent
Wood et al.

(10) Patent No.: US 8,558,917 B2
(45) Date of Patent: Oct. 15, 2013

(54) TRANSFERRING OF DIGITAL IMAGES

(75) Inventors: Kenneth Wood, Cambridge (GB);
Stephen Hodges, Cambridge (GB);
Lyndsay Williams, Cambridge (GB);
Mitch Goldberg, Cambridge (GB);
Carsten Rother, Cambridge (GB);
Antonio Criminisi, Cambridge (GB);
James Srinivasan, West Yorkshire (GB)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 12/096,305

(22) PCT Filed: Nov. 24, 2006
(Under 37 CFR 1.47)

(86) PCT No.: PCT/US2006/045371
§ 371 (c)(1),
(2), (4) Date: Dec. 8, 2008

(87) PCT Pub. No.: WO2007/067373
PCT Pub. Date: Jun. 14, 2007

(65) Prior Publication Data
US 2009/0284611 A1 Nov. 19, 2009

(30) Foreign Application Priority Data
Dec. 5, 2005 (EP) .................... 05257464

(51) Int. Cl.
*H04N 5/76* (2006.01)
*H04N 5/232* (2006.01)
*H04W 72/00* (2009.01)
*H04W 40/00* (2009.01)
*H04W 4/00* (2009.01)
*G08C 15/00* (2006.01)

(52) U.S. Cl.
USPC ............... 348/231.2; 348/211.3; 455/453; 455/445; 370/235; 370/332

(58) Field of Classification Search
USPC .......... 348/211.1–211.3, 231.1–231.3, 231.5, 348/231.6; 455/450, 452.1–453, 445; 370/238, 235, 311, 332
See application file for complete search history.

(56) References Cited

U.S. PATENT DOCUMENTS

| 5,983,264 | A | 11/1999 | Gardner |
| 6,243,761 | B1 | 6/2001 | Mogul et al. |

(Continued)

FOREIGN PATENT DOCUMENTS

| EP | 1549053 | 6/2005 |
| JP | 2000-184354 | 6/2000 |

(Continued)

OTHER PUBLICATIONS

EP Office Action for EP Application 05257464.7, mailed Apr. 7, 2010, counterpart of U.S. Appl. No. 12/096,305, 4 pages.

(Continued)

*Primary Examiner* — Sinh Tran
*Assistant Examiner* — Mark Monk
(74) *Attorney, Agent, or Firm* — Zete Law, P.L.L.C.; MacLane C. Key

(57) ABSTRACT

A method of transferring images from a first device to a second device and computer program code for performing this method is described. A connection characteristic for a connection between the first & second devices is determined and at least one image is selected from a plurality of images on the first device for transfer dependent upon both the connection characteristic and image selection criteria. The selected image(s) are then transferred over the connection from the first device to the second device.

20 Claims, 13 Drawing Sheets

(56) References Cited

U.S. PATENT DOCUMENTS

| | | | |
|---|---|---|---|
| 6,662,233 B1 | 12/2003 | Skarpness et al. | |
| 6,782,429 B1* | 8/2004 | Kisor | 709/241 |
| 2001/0040700 A1* | 11/2001 | Hannuksela et al. | 358/261.2 |
| 2002/0032005 A1* | 3/2002 | Yoshida | 455/41 |
| 2002/0051074 A1 | 5/2002 | Kawaoka et al. | |
| 2004/0127208 A1* | 7/2004 | Nair et al. | 455/420 |
| 2005/0105806 A1* | 5/2005 | Nagaoka et al. | 382/224 |

FOREIGN PATENT DOCUMENTS

| | | |
|---|---|---|
| JP | 2000184354 A | 6/2000 |
| JP | 2002-033947 | 1/2002 |
| JP | 2002033947 A | 1/2002 |
| WO | WO0210943 | 2/2002 |

OTHER PUBLICATIONS

European Search Report for EP Application 05257464.7, mailed Apr. 5, 2006, counterpart of U.S. Appl. No. 12/096,305, 9 pages.

International Search Report and Written Opinion of the International Searching Authority, for PCT/2006/0045371, counterpart of U.S. Appl. No. 12/096,305, mailed Mar. 30, 2007, 12 pages.

Viola and Jones, "Robust Real-time Object Detection," Second International Workshop and Computational Theories of Vision, Vancouver, CA, Jul. 13, 2001, 25 pages.

Bronshtein, et al., "5.2 Set Theory", Handbook of Mathematics, Springer Verlag, Berlin, DE, Jan. 1, 2003, pp. 290-298.

The European Office Action mailed May 3, 2012 for European patent application No. 05257464.7, 5 pages.

* cited by examiner

TRANSFERRING OF DIGITAL IMAGES

RELATED APPLICATIONS

This application is a National Stage of International Application No. PCT/US2006/045371, filed Nov. 24, 2006, which claims priority from European Patent Application No. 05257464.7, filed on Dec. 5, 2005. Both applications are incorporated herein by reference.

BACKGROUND

Over the last few years, the use of digital cameras has increased enormously, with digital cameras now commonly being incorporated into other portable electronic equipment, particularly mobile telephones. Over the same period, the resolution of those digital cameras has also increased considerably, with mobile telephones now having 2 Megapixel cameras integrated into them and digital cameras with upwards of 6 million effective pixels being widely available. Digital cameras allow users to take large numbers of photographs, knowing that they can be selective about which and how many images they may subsequently choose to print and/or keep. This results in a large number of images files being created and stored on a digital camera, where the file size for each image may be large. Digital cameras are therefore commonly designed to accept removable media, such as an SD card or compact flash card, into a slot in the camera, with most, if not all, of the image files being stored on this removable media.

SenseCam is a wearable camera developed by Microsoft Research, one use of which is to assist with memory recall by enabling a user to rewind through the recent events experienced by the wearer of the device. This may be particularly useful for memory-impaired individuals, or where an individual has experienced a traumatic event (e.g. an elderly person's fall resulting in injury).

The device can capture very large numbers of images and in addition to capturing images, the device also records sensor data, such as movement, light level and temperature every second. This sensor data is used to trigger the capturing of images, for example, when there is a change in light level or sudden movement. A change in light level may indicate that a user has moved from one room to another, or from inside to outside and therefore the image captured will indicate a change in location (and environment) of the wearer. The device has a wide angle or fish-eye lens so that the user does not need to worry about pointing the device in a particular direction. An accelerometer is used for image stabilisation. In the current SenseCam prototypes the image data and the sensor data are stored in FLASH memory.

Having taken large numbers of digital photographs on a digital camera, in order to manipulate, print or distribute the images, the user needs to transfer (or upload) the data to a computer (or similar device). This is typically done either by removing the removable memory card from the camera and inserting this into a card reader connected to or integrated into a computer, or by physically connecting the camera to the computer using a lead, such as a USB or FireWire lead. Such 'wired' technologies provide a fast link between the camera and the computer (e.g. data rates of up to 480 Mb/s for USB 2.0 and 800 Mb/s for FireWire).

However, as wireless capability is integrated into digital cameras or digital cameras are integrated into wireless capable devices, such as mobile telephones, the uploading of images may be done over the wireless links. This may be particularly beneficial when the user is away from home and wishes to upload images to a web site or email them to a friend or colleague. However, this can be a slow and frustrating process because the data rates obtainable over the wireless connections are one or more orders of magnitude less than can be achieved through the wired connections. At the fast end of wireless connections is WiFi technology with IEEE 802.11a and 802.11g providing 54 Mb/s, however Bluetooth provides only 720 kb/s and realistic data rates over GPRS may only be 30-70 kb/s, particularly in busy cells. In addition to the lengthy download times caused by the slow data rates, the wireless transmission can use a lot of battery power, so that the device needs recharging frequently. The battery consumption is affected by both the distance between the device (the transmitter) and the receiver and the data rate. Of the wireless technologies listed above, GPRS transmission will drain a battery quickest, whilst Bluetooth will have the lowest battery consumption. Furthermore, transferring files may also be expensive, with wireless hotspot operators typically charging £6-£12 per hour (for WiFi) and mobile phone operators typically charging between £1 and £4 per Megabyte (for GPRS).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A first example provides a method of transferring images from a first device to a second device, comprising the steps of: determining a connection characteristic for a connection between the first & second devices; selecting at least one image from a plurality of images on the first device for transfer dependent upon both the connection characteristic and image selection criteria; and transferring the selected at least one image over the connection.

Advantageously, this method adapts the transfer of images according to the available connection between the first and second devices and selects only a subset of the images stored on the device for initial transfer to the second device. This is particularly beneficial where the link between the first and second devices is of low bandwidth or low power.

Preferably, the connection characteristic comprises at least one of: a bandwidth of the connection, a power required to maintain the connection, a connection type, a connection technology, reliability of the connection, latency of the connection, an operator of the connection and a cost of the connection.

Preferably, the image selection criteria comprises at least one of: time and date, image content, image properties and a received input.

Preferably, the received input comprises at least one of: user-defined image selection criteria and a request for one or more images stored on the first device.

Advantageously, this allows a user to influence which images are uploaded. The received input may be received via a user interface on the first device, from the second device or from another device.

Preferably, the step of determining comprises: detecting available connections between the first and second devices; determining a connection characteristic for each of the available connections; and selecting a connection from the available connections based on the connection characteristic and connection selection criteria, and wherein the step of transferring comprises: transferring the selected at least one image over the selected connection.

Preferably, the connection selection criteria comprises at least one of: maximum connection bandwidth, maximum connection strength, a user-specified criteria and minimum connection cost.

Preferably, the step of selecting comprises: determining a target number of images; and selecting a set of representative images from a plurality of images on the first device, the set comprising the target number of images.

Preferably, selecting a set of representative images comprises: selecting a first image according to specified criteria; selecting a further image which gives an extreme value of a predefined energy parameter; and repeating the step of selecting a further image until the target number of images have been selected.

Advantageously, this selects a representative set of images from the accessed images to be displayed. The transferred set of images therefore provides a viewer with a good representation of the activities/scenes captured in the digital images. Depending on the energy parameter which is predefined, the extreme value may be the maximum value or the minimum value.

In another embodiment, the step of selecting comprises: determining a target number of images; calculating an interest parameter associated with each of a plurality of images on the first device; and selecting a set of images comprising the target number of images with the highest values of interest parameter.

In another embodiment, the image selection criteria is an image property and the step of selecting comprises: determining a requirement for the image property dependent upon the connection characteristic; selecting at least one image satisfying the requirement for the image property.

The method may further comprise the steps of: Selecting an image that does not satisfy the requirement for the image property; and Generating a new image from the selected image in accordance with the requirement for the image property, such that the new image satisfies the requirement for the image property.

Preferably, the image property comprises one of: file size, compression level, image resolution and colour depth.

The first device may comprise a photographic apparatus or a computer.

The second device may comprise a computer.

Preferably, the step of transferring comprises: Determining a transmission order for the selected at least one image; and Transferring the selected at least one image in the determined transmission order.

A second example provides a computer program comprising computer program code means adapted to perform all the steps of any of claims 1-15 when the program is run on a computer.

Preferably, the computer program is embodied on a computer readable medium.

A third example provides an apparatus comprising: a memory arranged to store a plurality of images; an output means to a connection between the apparatus and a second device; and a processor arranged to determine a connection characteristic of the connection between the apparatus and the second device, to select at least one image from the memory for transfer dependent upon both the connection characteristic and image selection criteria, and to transfer the selected at least one image over the connection via the output means.

Preferably, the output comprises at least one of a wired interface and a wireless transmitter.

The apparatus may further comprise a camera.

Another example provides a user interface comprising: a first element arranged to select a connection characteristic; a second element arranged to select an image selection criteria; and one or more elements arranged define a relationship between the connection characteristic, the image selection criteria and the method of selecting at least one image from a plurality of images stored on a first device for transfer to a second device.

The method may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
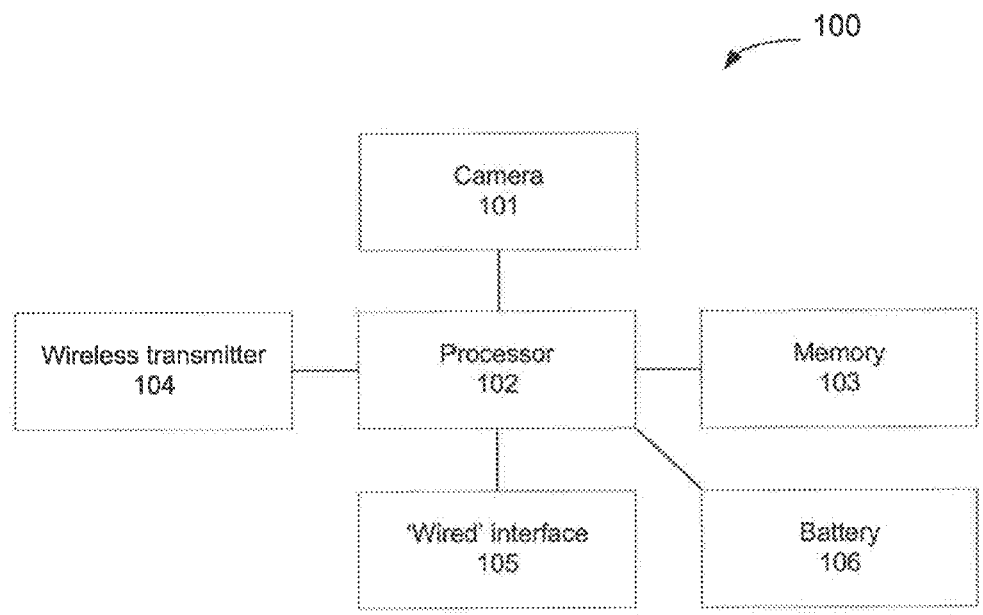
FIG. 1 is a schematic diagram of a photographic apparatus.

FIG. 1 shows a schematic diagram of a photographic apparatus 100 which comprises a camera 101, a processor 102 and a memory 103 for storing the captured digital images. The memory may comprise multiple memory types e.g. SRAM, FLASH, EEPROM. The memory may also be used to store program instructions (to be run on the processor 102) and other information. Data (including the images) can be transferred off the camera over a wireless connection to a computer (or other device) using a wireless transmitter 104, or alternatively over a wired connection using a wired interface 105 (for example a serial interface such as USB, RS-232 or FireWire). Some examples of photographic apparatus may have only a wireless transmitter 104 (e.g. some mobile telephones) or only a wired interface (e.g. some digital cameras). Some examples of apparatus may be capable of communicating using more than one wireless technology (e.g. Bluetooth and GPRS) and in this case the apparatus may have more than one wireless transmitter 104 or may alternatively have a wireless transmitter 104 which is capable of operating in several different modes. The apparatus 100 is powered by a battery 106. The apparatus 100 may take photographs automatically (for example, like the SenseCam) or may only take photographs when initiated by a user.

The term 'wireless' is used herein to mean a connection which does not involve a physical connection, i.e. a connection which is not 'wired'. It encompasses free space communication over the electromagnetic spectrum including RF communication, infra-red communication and free space optical communication. The term 'wired' herein is used to mean to a connection which does involve a physical connection such as a lead, wire or optical fibre, for example, USB, FireWire, Ethernet and optical Ethernet, which is connected via plug and socket (or other equivalent means) to both the transmitting and the receiving devices.

Figure 2:
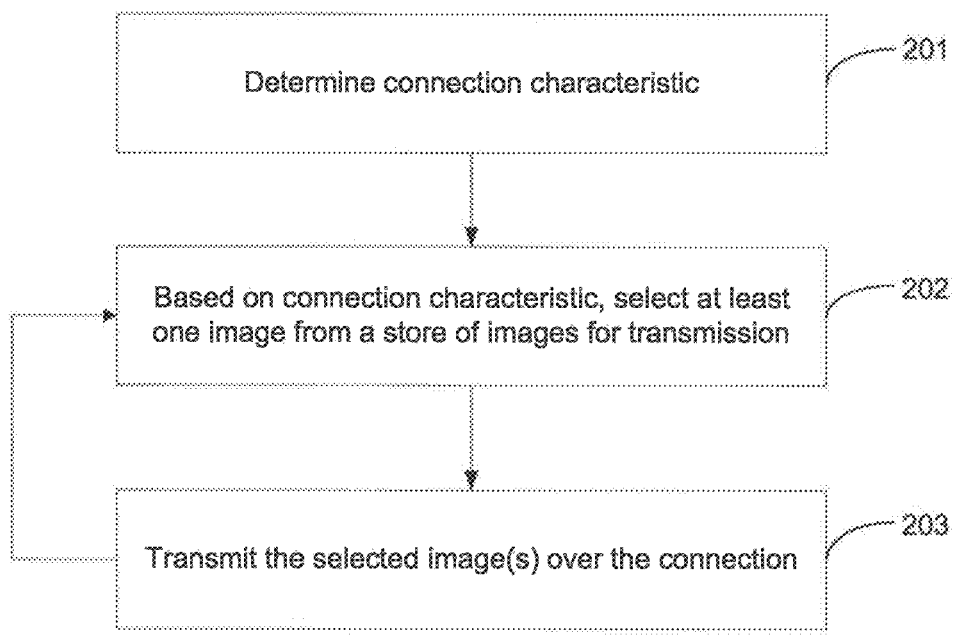
FIG. 2 is an example flow diagram of a method of transferring images.

The process of transferring images from the apparatus 100 shown in FIG. 1 to another device (such as a computer, server, web server or other photographic apparatus) can be described with reference to FIG. 2 which is an example flow diagram of a method of transferring images. First, a characteristic of the available connection to the other device is determined (step 201); this characteristic is referred to as a 'connection characteristic', Examples of connection characteristics include the connection bandwidth (e.g. 100 kb/s, 54 Mb/s, 800 Mb/s), the connection power requirements (e.g. in mW), the connection type/medium (e.g. wireless/wired), the connection technology (e.g. USB, Bluetooth, WiFi, GPRS) and the connection cost (e.g. in £/MB or $/minute). The connection characteristic used may be fixed or may varied (e.g. it may be specified by a user). The connection characteristic may comprise a combination of several factors (e.g. cost and bandwidth) and weighting may be applied to the different factors. This weighting may be fixed or may be specified by the user. The situation where there is more than one available connection is described below with reference to FIG. 3.

Having determined the connection characteristic (in step 201), this characteristic along with image selection criteria is used to select at least one image for transmission (step 202), the image(s) being selected from the images stored in the memory 103 of the device 100. The selected image(s) are then transmitted (step 203) over the available connection, e.g. over a wireless connection using the wireless transmitter 104 or over a wired connection via the wired interface 105. In one example, the process may stop once the images have been transferred (in step 203). In another example, having transferred the selected image(s) (in step 203), the process may be repeated by selecting at least one further image (step 202) and then transmitting the further selected image(s) (step 203). In this example, single images may be selected each time (in step 202) and then transferred individually (in step 203) or groups (or batches) of images may be selected (in step 202) and then transferred (in step 203). An example where an image is repeatedly selected from those stored on the device and then transmitted is described in more detail below with reference to FIG. 5.

The transmission of the images may use any suitable method/protocol including, but not limited to, file transfer, email and MMS. The images may be transmitted from the apparatus 100 to any other entity, including, but not limited to, a computer, a server, a web server, another photographic apparatus, a mobile phone or a PDA (personal digital assistant). Each of the method steps shown in FIG. 2 are described in more detail below.

Figure 3:
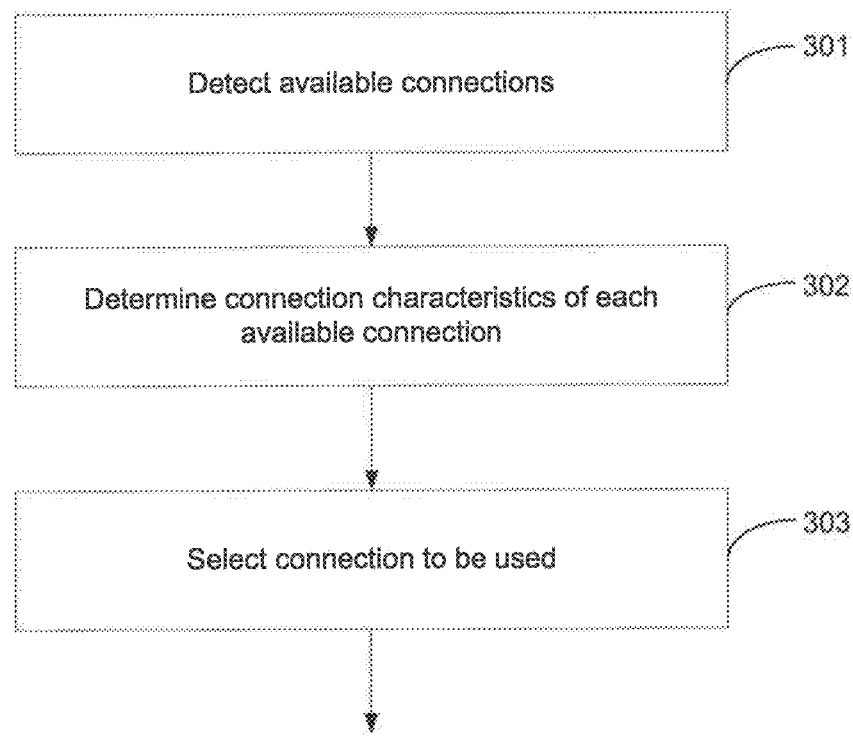
FIG. 3 is an example flow diagram showing the step of determining the connection characteristic.

FIG. 3 shows an example flow diagram showing the step of determining the connection characteristic (step 201) in more detail. First the available connections are detected (step 301) and a connection characteristic (e.g. bandwidth) determined for each available connection (step 302). Based on these determined characteristics, a connection can then be selected for use (step 303). The selection may be based on criteria which are fixed or may be user-defined. In a first example, the connection with the highest bandwidth may be selected; in another example the lowest monetary cost connection (e.g. in f/kb) may be selected. In a further example, the connection requiring the least power may be selected to prevent draining of the battery 106. In another example more than one characteristic may be determined for each available connection and these may be used in combination to select the connection to be used, e.g. cost and bandwidth. For example, if several wireless connections are available, cost may first be used to identify those connections which are free of charge and then the connection with the highest bandwidth may be selected.

There are many different selection methods which may be used to select at least one image from those stored on the device dependent on both the connection characteristic and image selection criteria (step 202), including:
   Selection according to time/date stamp
   Selection according to position in sequence
   Selection of a representative set of photographs
   Selection of the most interesting images
   Selection according to the difference between images
   Selection according to image properties (e.g. image size)
   Selection according to a received input
Examples of the image selection criteria used include, time and date of image capture, image content, image properties and a received input. Some example selection methods are described in more detail below. The connection characteristic may be used within a selection method, for example to determine the image selection criteria used or the target value of image selection criteria. Alternatively, the connection characteristic may be used to determine which selection method is used.

Figure 4:
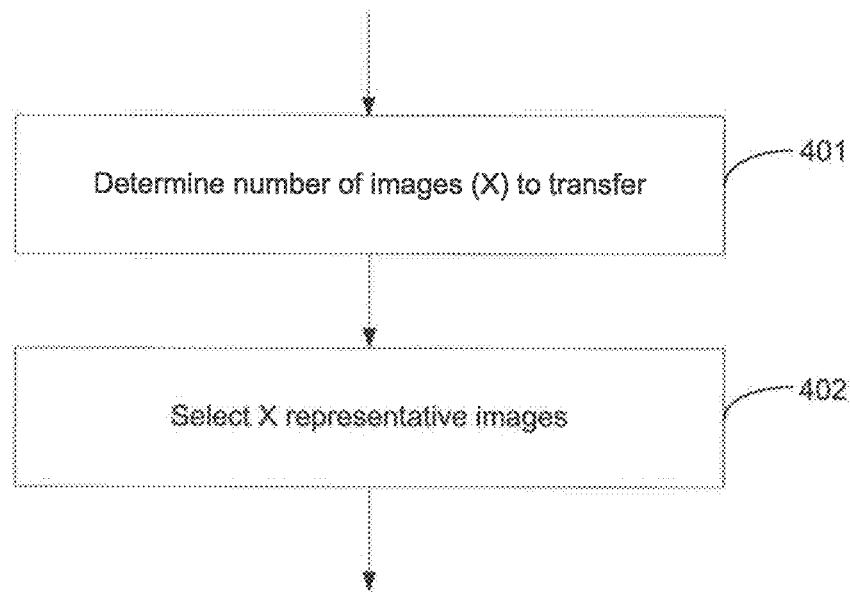
FIG. 4 is a first example flow diagram for the step of selecting at least one image dependent upon both the connection characteristic and image selection criteria.

FIG. 4 shows a first example flow diagram for the step of selecting at least one image dependent upon both the connection characteristic and image selection criteria. First the number of images, X, to transfer is determined based on the connection characteristic (step 401). The number of images, X, may be considered a maximum number of images to transfer if the image store on the device contains fewer images than the identified number of images to transfer. The number of images, X, may be determined by a look-up table, such as shown below:

| Bandwidth of connection | No. of images to transfer (X) |
|---|---|
| <500 kb/s | 2 |
| 500-2000 kb/s | 10 |
| 2-100 Mb/s | 20 |
| >100 Mb/s | All images |

The values in the look-up table shown above may be determined by the user. In another example, the number of images, X may be calculated based on user-specified parameters, such as maximum transfer cost, maximum transfer time, maximum power usage on transfer etc. The value of X can be calculated from the user-specified parameter combined with the connection characteristic determined earlier (in step 201). In some situations, the look-up table or calculation may determine that X=0, i.e. that no transfer should occur at this point. This may be beneficial when the only available connections are very low bandwidth, expensive or low signal strength (which requires high power consumption to transfer the images).

Where it is determined that all the images should be transferred (i.e. X=all), the selection methods described herein may still be used to prioritise images for transferring, either one at a time or in batches, (where in the discussion below the batch size may be used instead as the value of X).

Having determined the number of images to transfer, X, a set of X representative images is selected (step 402) based on image selection criteria, which in this example is image content. The method selects a set of images so as to contain the most representative images from those images which are stored on the device. If the store of images comprises n images, a vector x is defined which has n elements, where x(i)=1 if image i is selected as one of the representative set of images and otherwise x(i)=0. Consequently, if 10 images are to be selected from a store comprising 100 images, the vector x will have 100 elements (n=100) of which 10 elements will be equal to one and 90 elements will be equal to zero.

In order to select a representative set of X images, an energy, E is defined as:

$$E = \sum_i \text{Imp}(i)\delta(x(i) == 1) + \lambda_{Sim} \sum_i \min_j Sim(i, j)\delta((x(i), x(j)) == (1, 1))$$

Where:
$\delta(\text{arg})=1$ if arg is true, otherwise $\delta(\text{arg})=0$
$\lambda_{Sim}$ is a constant and an example value is 100
Sim(i,j) is the similarity between two images. Two identical images i,j have Sim(i,j) equal to zero, two very different images i,j have a high value for Sim(i,j). This is defined as the distance between two images, e.g. the sum of absolute differences (SAD) of the texton histogram of the two images (described in more detail below). A texton histogram is used, as described below, because it looks at both the colour and texture in an image. In another example, a colour histogram could be used to compare just the distribution of colours of pixels in particular images. Imp(i) is the importance of an image, with the value being high for images which are considered important. In one example it may be defined as:

$$\text{Imp}(i) = \text{weightFaces} + \text{Entropy}(i)$$

Where:
weightFaces=0.008 if there is a face in the image, otherwise weightFaces=0.
An example of a suitable face detection algorithm is described in a paper by P. Viola and M. Jones entitled 'Robust Real-Time Object Detection' presented at the International Conference on Computer Vision (ICCV) 2001.

$$\text{Entropy}(i) = -\sum_{c=1}^{m} \sum_{i=1}^{k} p_i^c \log(p_i^c)$$

Where:
Entropy(i) is a measure of how interesting a picture is (e.g. a uniform colour image would be of low interest, whilst a detailed, multi-coloured image is of high interest).
k is the total number of pixels
m is the number of image channels (e.g. RGB image has 3 channels)
$p_i^c$ is the value of pixel i in channel c.

In the above equations, an image is considered important if there are faces in the image and if the image has high entropy, i.e. a high interest level. Other factors may be used instead, or in addition, to determine the importance of an image. For example, the sharpness of an image could be included, with blurred images having a very low value (e.g. 0) and sharp images having a higher value. A user may be able to define which aspects of an image they consider to be more important than others (e.g. sharpness vs. presence of faces), e.g. via a UI.

Figure 8:
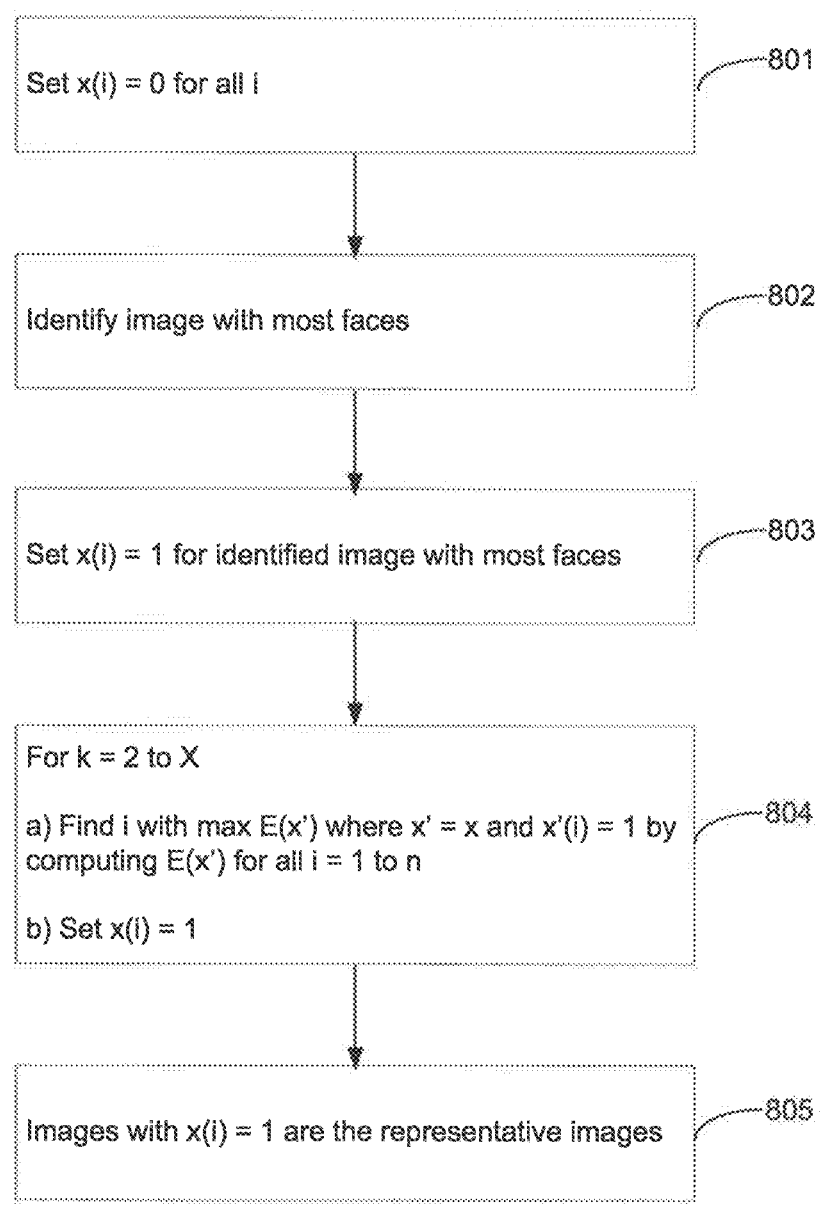
FIG. 8 is an example flow diagram for a method of selecting a representative set of images.

In order to select a set of representative images, the maximum value of the energy E must be found. This optimisation may be performed as shown in FIG. 8 by selecting one image at a time. First x(i) is set equal to zero for all i, (step 801). The image with the most faces is the first image selected (step 802) and for this image, x(i) is set equal to one (step 803). Then, one by one the remaining X−1 images are selected by finding the image (the i) which gives the maximum energy E (step 804, which comprises parts 804a and 804b). To select the second image, all the remaining n−1 images are examined in turn and the value of E calculated to find which image (which i) gives the maximum value (step 804a) and once identified the value of x(i) for this second selected image is set equal to 1 (step 804b). This is then repeated to select the third image, with all the remaining n−2 images being examined in turn and the value of E calculated to find which image (which i) gives the maximum value (step 804a) and once identified the value of x(i) for this third selected image is set equal to 1 (step 804b). This is then repeated until X images have been selected and these are the ones which, in the vector x, have x(i)=1 (step 805).

In order to perform the above calculation of values of E (in step 804a), it is necessary to calculate the values of Sim(i,j). As described above, this is defined as the distance between two images, e.g. the sum of absolute differences (SAD) of the texton histogram of the two images. In order to calculate the SAD of the texton histogram of the two images, i and j, a universal vocabulary of textons is required. This is defined on the basis of many training images and the vocabulary is typically application dependent, so the training images are preferably of a similar type to the actual images that will be in the source. For example images taken by a SenseCam have distinctly different properties from images taken by a conventional digital camera. Consequently, it would be appropriate to use SenseCam images as training images when a source of SenseCam images is to be used and standard digital camera images should be used as training images when a source of standard digital camera images is to be used. Where other types of images are to be selected from, an appropriate set of representative images should be used as the training images in order to define the universal vocabulary.

Figure 9:
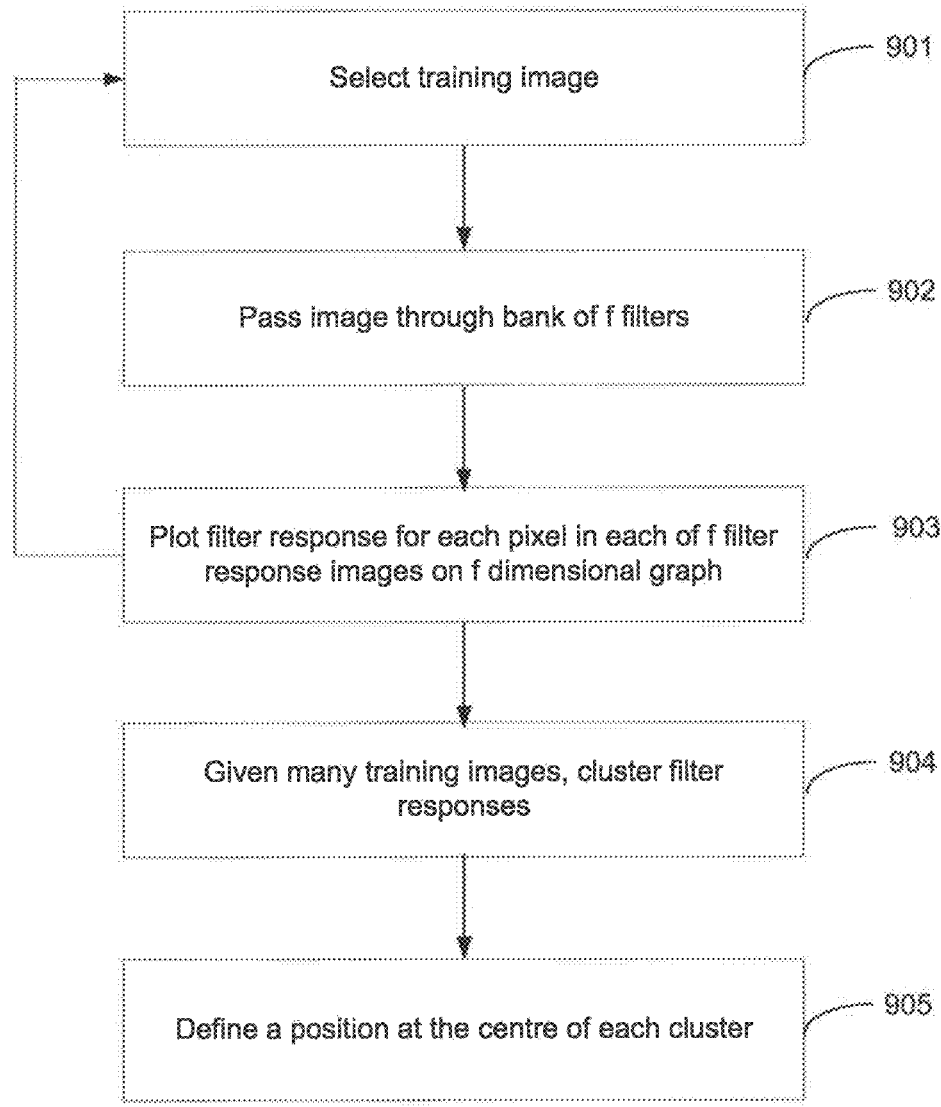
FIG. 9 is an example flow diagram showing a process for defining a universal texton vocabulary.
Figure 10:
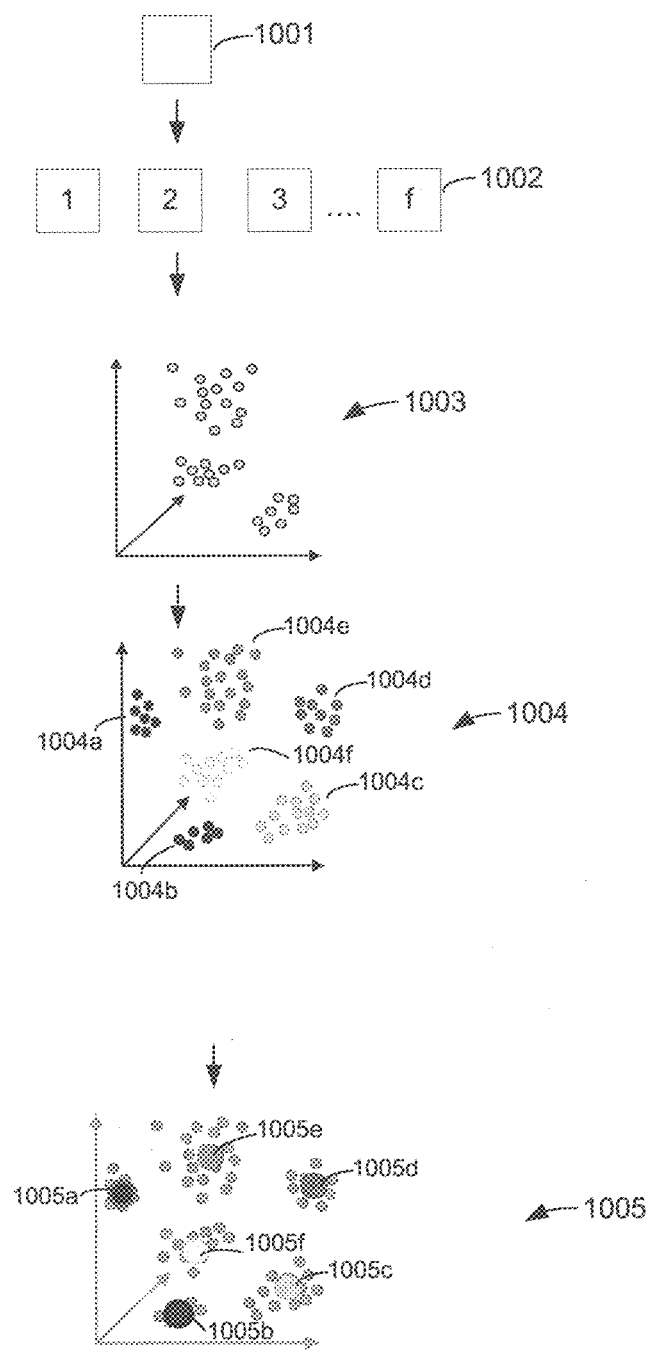
FIG. 10 is schematic diagram of stages in the process for defining a universal texton vocabulary shown in FIG. 9.

The process of defining the universal vocabulary can be described with reference to FIGS. 9 and 10. A first training image 1001 is selected (step 901) and this image is passed through a bank of filters (step 902), such as a bank of Gabor filters, where f is the number of filters used. It is the use of filters in this manner which enables texture information to be obtained. The filters typically capture information from an area of 10×10 pixels around each pixel. Typically a bank of 17 filters are used, (f=17) and the same filter set can be used for any application or any image type. The output of this step (step 902) is a set of filter response images 1002, one image for each filter (i.e. f filter response images). The filter response of each pixel in each filter response image is then plotted in f dimensions (step 903). Considering a particular pixel at position (x,y) in the original training image 1001, there are f filter responses, one for each filter in the bank (i.e. the filter response at position (x,y) in each of the f filter response images 1002). This creates a vector with f elements, $(r_1, r_2, r_3, \ldots r_f)$ which can then be plotted on the f-dimensional graph 1003. These three steps (901-903) are then repeated many times with different training images and all the points are plotted on the same graph 1004. Clusters 1004a-f of points on the graph are then identified (step 904), for example using the k-means algorithm, and a position 1005a-f at the centre of each cluster is defined (step 905). The result is therefore a set of vectors, each comprising f elements, each defining the position at the centre of a cluster. This set of vectors (6 vectors in the example shown in FIG. 10, although typically there are 50 vectors or 'visual words') is the universal vocabulary of textons (for images of the same type as the training images used). Each visual word (or vector) results in a bin in the texton histogram, as described below. A small number of words (and hence bins) results in faster processing speed when performing the comparison between images, however, a larger number of words provides a better measure of the differences or similarities between images.

Figure 11:
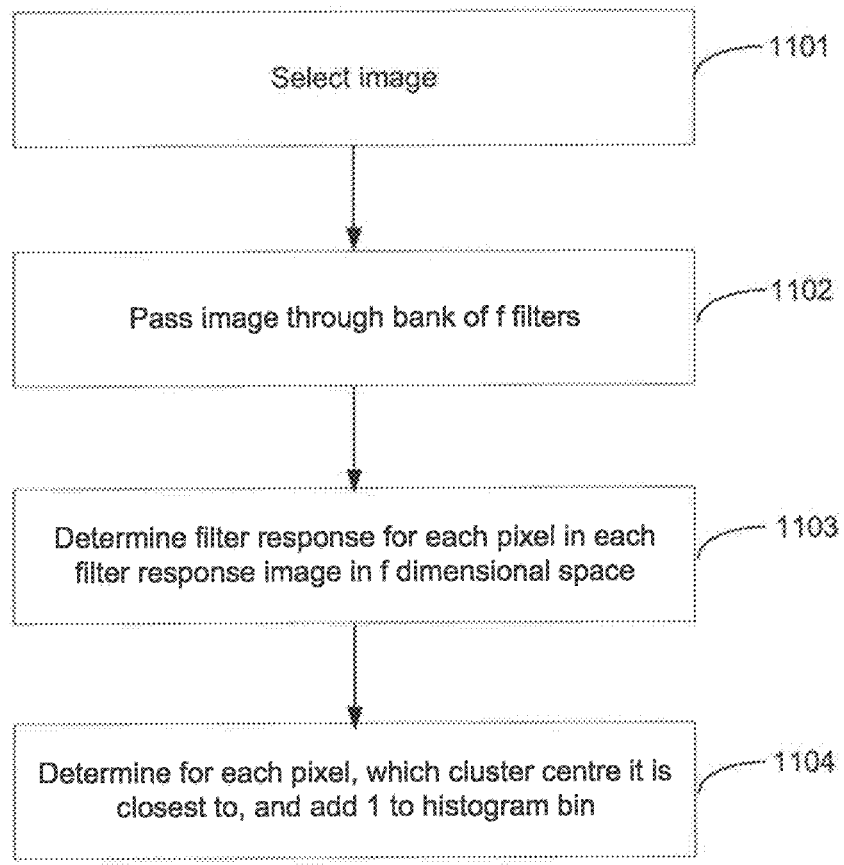
FIG. 11 is an example flow diagram showing a method for determining a texton histogram of an image.
Figure 12:
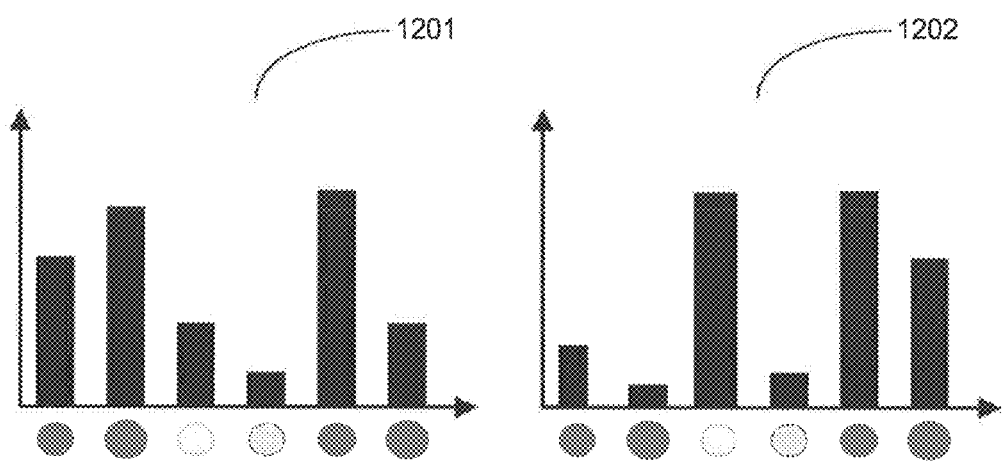
FIG. 12 shows two examples of texton histograms.

Having determined the universal vocabulary of textons, the texton histogram of an image can be calculated, as shown in FIG. 11. The image is selected (step 1101) and passed through the same bank of f filters used in determining the universal vocabulary (step 1102). The filter response for each pixel of the image is then determined for each of the f filters to provide a position in f-dimensional space (step 1103) and then this position is compared to the universal vocabulary (e.g. the 6 visual words shown in 1005) to determine which cluster centre position (defined in step 905) each pixel is closest to. The results are plotted on a histogram with one bin for each visual word and with one entry per bin for each pixel which is closest to that visual word. Examples of two texton histograms 1201, 1202 are shown in FIG. 12. The SAD of texton histogram of the two images, i and j, can then be calculated (i.e. the sum of the absolute differences between the size of each bin) and this gives the value for Sim(i,j) which is used to calculate the Energy, E, as described above.

In another example of a method of selection, in which the selection is made according to time/date stamp of the photographs, the target number of images is first selected (as in step 401) and then the required number of photographs (X) are selected from all those stored on the device so that the selected set are as evenly distributed in time across the period of time covered by the images as possible. Although this method provides images which are well spaced in time throughout the period of interest, the selected images may not be representative and may miss clusters of images if they fall at the wrong point along the timeline.

In a further example of a method of selection, in which the selection is made according to the position of the photographs in a chronological sequence, the target number of images is first selected (as in step 401) and then the required number of photographs are selected from all those in the store so that the selected set are as evenly selected from the sequence of photographs as possible. For example, when selecting 6 images (X=6) from a store of 21 images, the 1st, 5th, 9th, 13th, 17th and final (21 st) images are selected. Although this method provides images which are well spaced throughout those in the store, the selected images may not be representative of the whole set of 21 images.

In another example method of selection, the most interesting images may be selected. This may be selected using the parameter Entropy(i), as described above, or alternatively by using the image file size as an indication of interest level. When images are compressed, the resulting file size varies according to the level of detail in the image, for example a uniform image (e.g. all black) will have a much smaller file size than a very detailed image. First, the target number of images (X) is determined as described above (with reference to step 401) and then the X most interesting images may be selected by selecting the X images with the largest file sizes or the largest values of Entropy(i).

In a further example of a method of selection, images may be selected according to a 'difference' threshold. For example, images may be selected such that they differ by at least a minimum amount (the 'difference' threshold), which may be defined in terms of the SAD (as described above). In an example, images may be selected such that no two adjacent images have a SAD below 20. In this example, the number of images (referred to as X above) may not be fixed but may vary depending on whether the images stored on the photographic apparatus 100 are very similar (X will be smaller) or very different (X will be larger).

Figure 5:
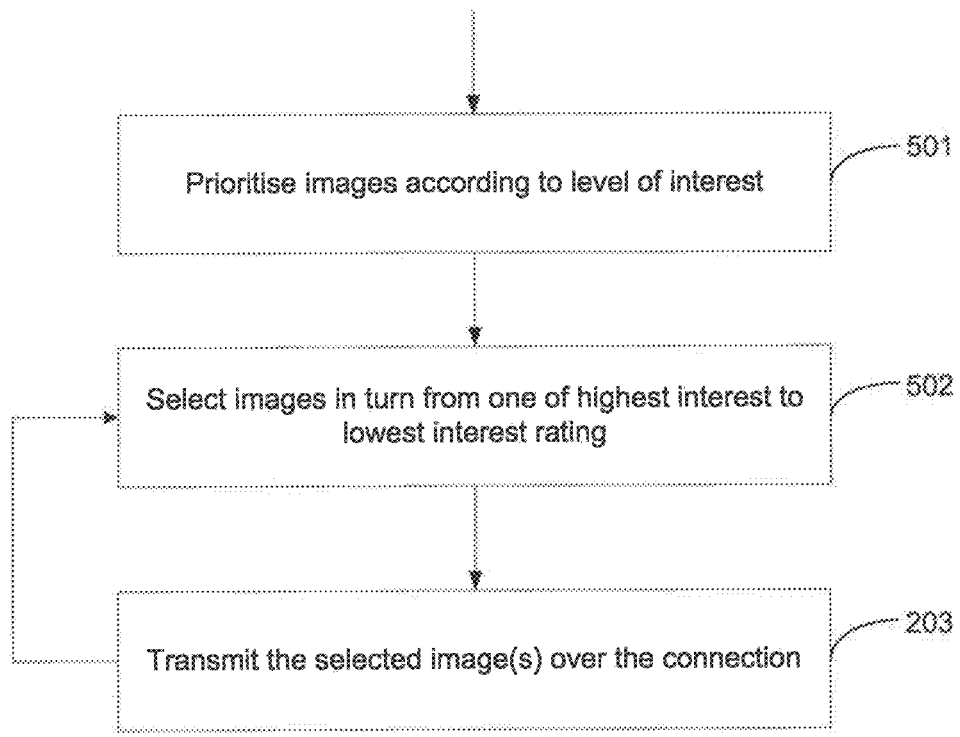
FIG. 5 is a second example flow diagram for the step of selecting at least one image dependent upon both the connection characteristic and image selection criteria.
Figure 6:
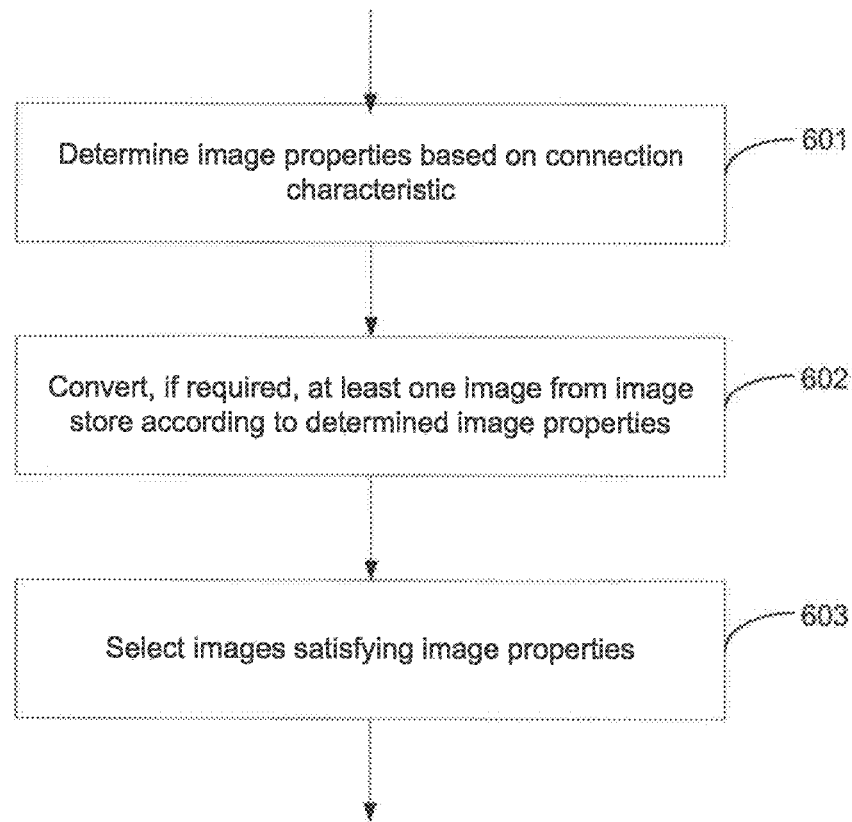
FIG. 6 is a third example flow diagram for the step of selecting at least one image based on the connection characteristic and image selection criteria.

FIG. 5 shows a second example flow diagram for the step of selecting at least one image dependent upon both the connection characteristic and image selection criteria. The flow diagram also shows the transmitting step (step 203). The images stored on the device (e.g. in the memory 103) are prioritized for transfer according to a level of interest of the image (step 501). This prioritization by level of interest can be performed using either of the techniques described above (i.e. file size or value of Entropy(i)). The images can then be selected one at a time in order from most interesting to least interesting (step 502) and once an image has been selected it can be transferred (step 203). By repeatedly selecting an image in order from most interesting to least interesting (in step 502) and transmitting the selected image (in step 203), the images are transmitted in order of decreasing level of interest. A threshold level of interest may be defined based on the connection characteristic, such that images with a level of interest below the threshold are not selected (in step 502). The threshold may be defined in a look-up table, in a similar manner to shown above in relation to step 401 (FIG. 4) or shown below in relation to step 601 (FIG. 6). In an example, the threshold may increase as the bandwidth of a connection decreases.

FIG. 6 shows a third example flow diagram for the step of selecting at least one image based on the connection characteristic and image selection criteria, (image properties, in this example). First, image property requirements are determined from the connection characteristics (step 601). These image property requirements are the properties which will be used for any images which are transferred and may include maximum file size, compression level and/or image size. Again these image property requirements may be determined using a look-up table, specified algorithm or other technique. An example look-up table is shown below:

| Bandwidth of connection | Image size |
|---|---|
| <2 Mb/s | Thumbnail |
| >2 Mb/s | Full size |

This example look-up table specifies that for low bandwidth connections only thumbnails are transferred, whilst for high bandwidth connections the full size images are transferred. Having determined the image property requirements, it may be necessary to convert some or all of the images stored in the memory 103 (step 602), e.g. by generating thumbnails. These new image files (e.g. the thumbnail files) are also stored in the memory 103. Images which meet the determined image property requirements are then selected from the store (step 603). In the example above, if the connection characteristic (bandwidth) was less than 2 Mb/s, the image property requirement (with image selection criteria=image size) would be 'thumbnail'. Unless suitable image files have already been created (e.g. they may be created automatically by the apparatus 100), these would need to be created and stored in the image store on the device. The thumbnail image files would then be selected (in step 603) and transmitted (in step 203).

Figure 7:
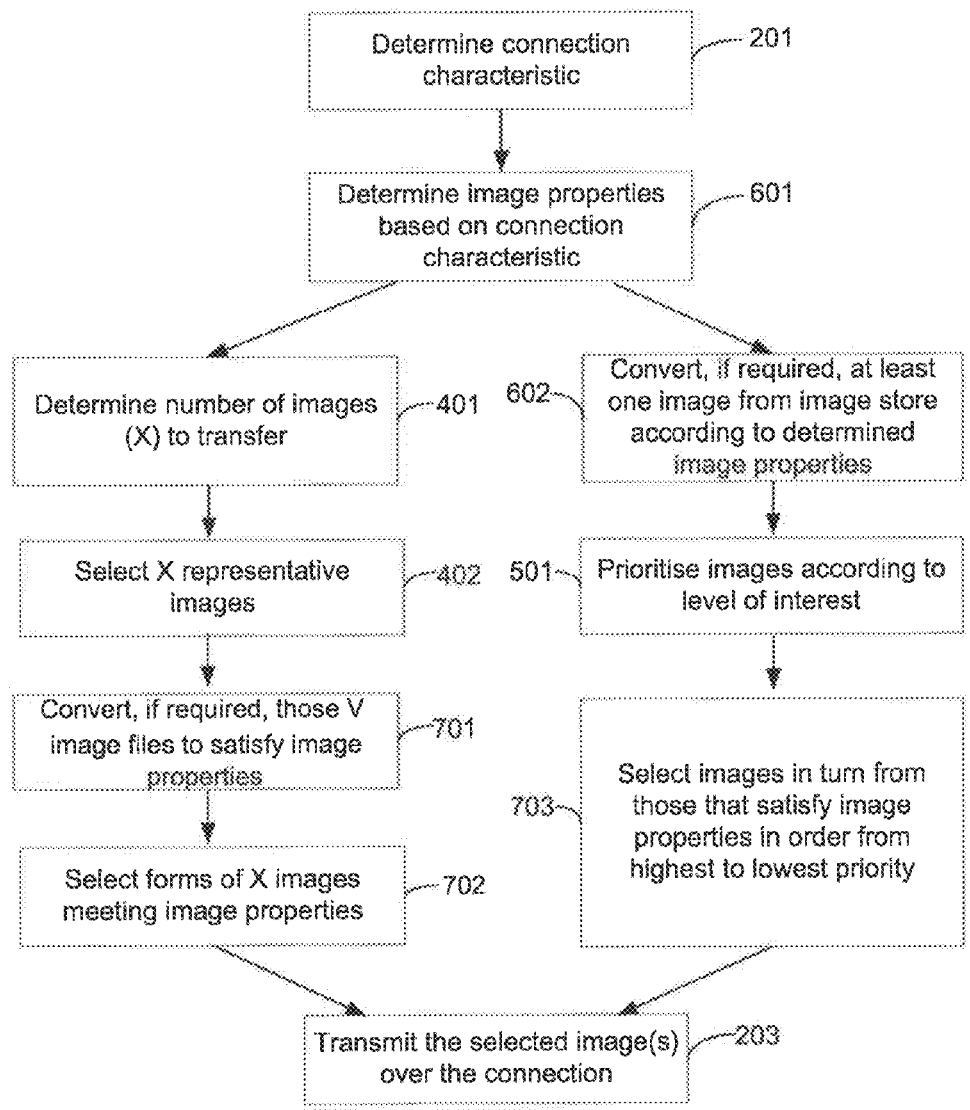
FIG. 7 is a fourth example flow diagram for the step of selecting at least one image based on the connection characteristic and image selection criteria.

The steps shown in FIG. 6 may be used independently or in combination with the other selection techniques described above. The example flow diagram shown in FIG. 7 shows the use of the steps of FIG. 6 in combination with the methods of either FIG. 4 or FIG. 5. In this example, the connection characteristic is first determined (step 201) and image properties determined based on the connection characteristic (step 601). At this point, FIG. 7 shows two example selection methods. In the first, a number of images, X, to transfer is determined (step 401) and then X representative images are selected (step 402). The files for the X selected images are then converted to satisfy the determined image properties (in step 601) if required (step 701, a modified version of step 602) and the new converted images selected (step 702, a modified version of step 603). In the second, the images in the store are converted to meet the image properties, if required, (step 602) and the images prioritized according to level of interest (step 501). The images are then selected in turn from those that satisfy the image properties and in order from highest to lowest priority (step 703, a combination of steps 502 and 603). Finally, the selected images are transmitted over the connection (step 203). In this example, the connection characteristic may comprise several aspects (e.g. bandwidth and connection technology), with different aspects of the characteristic being used in different steps, for example using the bandwidth to determine the number of images to transfer (X, in step 401) and the connection technology used to determine the image properties (in step 701).

In another example selection method, images may be selected based on the connection characteristic (e.g. bandwidth) and image selection criteria (date and time of image capture) such that when the bandwidth is below a threshold, only images taken during a defined period, such as the last 30 minutes may be transferred. This may be particularly beneficial when images are being uploaded to a web server, (e.g. as a blog diary) to ensure that bandwidth is not wasted by uploading images which may be considered out of date.

Further examples of the image selection step (step 202) may also include other factors including user-specified criteria. A user may identify particular attributes of images to be used in the selection process and these may comprise the image selection criteria. For example, a user may define that only images with people in should be transferred or that no images with faces in should be transferred. This may be particularly beneficial when the images are being transferred to a web site for automatic inclusion in a blog because it allows some user control over what will be published without requiring them to review every image. In another example, user inputs may specify the weighting of certain factors in defining which images are considered more important than others (e.g. in the methods described with reference to FIGS. 4 and 5). User inputs may also define which selection methods are used in which situations. User inputs may be received via a user interface (UI) which may be on the apparatus 100 or on another device (e.g. a computer) with the user inputs being transferred to the apparatus 100 for example in the form of an XML file.

In another example, the selection method, (used in step 202) may be affected by instructions received over a connection, (i.e. a received input). These instructions may be transmitted to the camera specifically to affect the selection process or alternatively the input may be received for another purpose but may also affect the selection process. For example, where only thumbnails are initially transferred (as described above with reference to FIG. 6), a person viewing these thumbnails may send a request for the transfer of the full size image. This may be applicable to news photographers who may take many images which are transferred over a wireless connection to their editor whilst they are still away from the office. The editor can then review the thumbnails and decide which, if any, images he requires in full at that time. He can then send a request to the camera which initiates the selection and transfer of the full image. The connection characteristic may still be used in combination with the input received, for example to determine whether the full image can be transferred and what level of compression should be used.

Aspects of any of the methods described above may be combined in other selection methods, for example, the time and date image selection criteria may be used to limit those images which are selected as representative or interesting images (e.g. the images are selected from only those images created in the last 24 hours).

Figure 13:
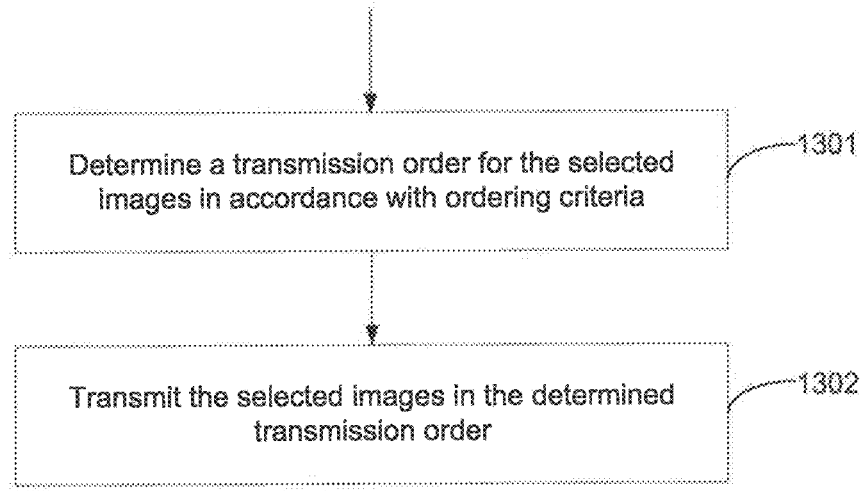
FIG. 13 is an example flow diagram for the step of transmitting the selected images over the available connection.

FIG. 13 shows an example flow diagram for the step of transmitting the selected images over the available connection (step 203), where the earlier step of selecting at least one image has selected more than one image. A transmission order is determined for the selected images (selected in step 202) in accordance with an ordering criteria (step 1301). Examples of ordering criteria include:

Decreasing interest levels (i.e. most interesting first)
Increasing age of image (i.e. most recent images transmitted first)
Decreasing age of image (i.e. in the order that the photographs were taken, with the most recent photographs being transmitted last)
Decreasing/increasing file size
User-specified criteria Having determined the transmission order (in step 1301), the selected images are transmitted in the determined transmission order (step 1302).

When the images are transmitted (in step 203), progressive uploading techniques may be used, such as progressive JPEG or iterative GIF. By using such processes, the image is initially transferred, and can be viewed, as a low-quality image. As further data is transferred, the quality of the image is improved.

Although the above methods are described with reference to transferring of images from a photographic apparatus 100 to another device, such as a computer, a server, a web server or another photographic apparatus, the methods may also be used to transfer images from any device (e.g. a computer or PDA) to any other device.

Those skilled in the art will realize that storage devices utilized to store program instructions and/or images can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A method of transferring images from a first device to a second device, comprising:
   determining a connection characteristic for a connection between the first device and the second device;
   calculating an interest parameter for each of a plurality of images stored on the first device, the interest parameter being a value;
   selecting a subset of images from the plurality of images on the first device for transfer dependent upon the connection characteristic and image selection criteria, wherein the image selection criteria:
      are based at least in part on a sum of the respective interest parameters of images in the subset and a sum of measures of differences between pairs of images in the subset, the pairs being a first image in the subset and a second image in the subset, the second image having the least measure of difference from the first image amongst images in the subset; and
      set a minimum difference threshold so that each image in the subset of images differs from the other images in the subset of images by at least a predetermined amount; and
   transferring the selected subset of images over the connection from the first device to the second device.

2. A method according to claim 1, wherein the connection characteristic comprises at least one of: a bandwidth of the connection, a power required to maintain the connection, a connection type, a connection technology, reliability of the connection, latency of the connection, an operator of the connection and a cost of the connection.

3. A method according to claim 1, wherein the image selection criteria are further based at least in part on a distribution of images according to time and date.

4. A method according to claim 1, wherein the determining comprises:
   detecting available connections between the first device and the second device;
   determining respective connection characteristics for each of the available connections; and
   selecting the connection from the available connections based on the connection characteristics and connection selection criteria.

5. A method according to claim 4, wherein the connection selection criteria comprises at least one of: maximum connection bandwidth, maximum connection strength, a user-specified criteria and minimum connection cost.

6. A method according to claim 1, wherein selecting the subset of images comprises:
   selecting an image with a calculated interest parameter based on a value of a predefined energy parameter; and
   iteratively selecting a further image based on values of the predefined energy parameter until a target number of images have been selected, the subset of images selected for transfer being a number limited by the target number of images.

7. A method according to claim 1, wherein the image selection criteria are further based in part on an image property and wherein the selecting comprises:
   determining a requirement for the image property dependent upon the connection characteristic; and
   selecting the subset of images based at least in part on satisfying the requirement for the image property.

8. A method according to claim 7, further comprising:
   selecting an image that does not satisfy the requirement for the image property; and
   generating a new image from the selected image in accordance with the requirement for the image property, such that the new image satisfies the requirement for the image property.

9. A method according to claim 8, wherein the image property comprises one of: file size, compression level, image resolution and colour depth.

10. A method according to claim 9, wherein the first device comprises a photographic apparatus or a computer.

11. A method according to claim 10, wherein the second device comprises a computer.

12. A method according to claim 11, wherein the transferring comprises:
    determining a transmission order for the selected subset of images; and
    transferring the selected subset of images in the determined transmission order.

13. A device comprising:
    a memory arranged to store a plurality of images; and
    a processor, coupled to the memory, arranged to:
       determine a connection characteristic of a connection between the device and a second device;
       select a subset of the plurality of images from the memory as target images for transfer dependent at least in part upon the connection characteristic and an image selection criteria that identifies the subset of the plurality of images based on determinations that a sum of absolute differences between at least two images reach or exceed a minimum difference threshold, the image selection criteria being based on a sum of importance values, the importance values corresponding to images in the subset, and on a sum of similarity values, the similarity values being a measure of similarity between pairs of images in the subset, the pairs of images including a first image and a second image, the second image being the most similar to the first image amongst the images in the subset; and transfer the target images to the second device over the connection.

14. A device according to claim 13, wherein the connection is established via at least one of a wired interface and a wireless transmitter.

15. A device according to claim 13, further comprising a camera configured to digitally capture one or more of the plurality of images.

16. A method according to claim 1, wherein the interest parameter for each image is calculated in accordance with at least one of:
- an entropy parameter indicating an interest level of the image;
- an image file size indicating an interest level of the image; or
- a detection of one or more faces in the image.

17. A method according to claim 1, wherein the plurality of images are digitally captured for memory recall.

18. A method comprising:
- determining a connection characteristic for a connection between a first device and a second device;
- determining an image selection criteria that selects images for transfer from the first device to the second device, wherein the image selection criteria is based at least in part on one or more difference parameters calculated for each of the plurality of images;
- prioritizing a plurality of images stored at the first device for transfer based at least in part on the respective one or more difference parameters that satisfy a minimum difference threshold;
- determining a target number of images capable of being transferred based at least in part on the connection characteristic and the respective one or more difference parameters that satisfy the minimum difference threshold; and
- transferring the target number of images from the first device to the second device over the connection.

19. A method according to claim 18, wherein the predetermined amount is in terms of a sum of absolute differences between two images.

20. A device according to claim 13, wherein the image selection criteria use a predefined energy parameter defined as:

$$E = \sum_i \mathrm{Im}p(i)\delta(x(i) == 1) + \lambda_{Sim} \sum_i \min_j Sim(i, j)\delta((x(i), x(j)) == (1, 1))$$

where:
$\delta(\text{arg})=1$ if arg is true, otherwise $\delta(\text{arg})=0$, $\lambda_{Sim}$ is a constant, $Sim(i,j)$ is a value indicating similarity between two images i,j and Im p(i) is an importance value of an image i.

* * * * *